United States Patent
Marrs et al.

(10) Patent No.: US 6,755,460 B1
(45) Date of Patent: Jun. 29, 2004

(54) VEHICLE BODY PANEL MOUNTING SYSTEM

(75) Inventors: Joseph F. Marrs, Aubrey, TX (US); Derek L. Davis, Denton, TX (US)

(73) Assignee: Paccar Inc., Bellevue, WA (US)

( * ) Notice: Subject to any disclaimer, the term of this patent is extended or adjusted under 35 U.S.C. 154(b) by 0 days.

(21) Appl. No.: 10/376,509

(22) Filed: Feb. 28, 2003

(51) Int. Cl.[7] .............................................. B60J 7/00
(52) U.S. Cl. ............. 296/187.12; 280/833; 296/203.03; 296/180.2
(58) Field of Search ................ 296/187.12, 180.2, 296/187.01, 203.03, 146.7, 190.01, 146.6, 210, 209; 280/830, 833, 163, 157, 838; 222/130, 609; 16/267; 29/434, 527.1; 439/374; 180/69.21

(56) References Cited

U.S. PATENT DOCUMENTS

| | | | | |
|---|---|---|---|---|
| 1,158,394 A | * | 10/1915 | Skelton | 280/830 |
| 2,090,059 A | * | 8/1937 | McClane | 280/833 |
| 2,742,191 A | * | 4/1956 | Corshaw | 222/130 |
| 2,902,240 A | * | 9/1959 | La Belle | 280/833 |
| 3,227,410 A | * | 1/1966 | McCuen | 280/833 |
| 3,416,185 A | * | 12/1968 | Peterson | 16/267 |
| 4,102,432 A | * | 7/1978 | Bustin | 280/163 |
| 4,597,153 A | * | 7/1986 | Zaydel | 29/434 |
| 4,925,235 A | * | 5/1990 | Fingerle | 296/180.2 |
| 4,973,102 A | * | 11/1990 | Bien | 296/187.01 |
| 5,040,335 A | * | 8/1991 | Grimes | 296/187.12 |
| 5,224,752 A | * | 7/1993 | Marshall | 296/187.12 |
| 5,511,808 A | * | 4/1996 | Rowland | 280/157 |
| 5,590,819 A | * | 1/1997 | Armstrong | 222/609 |
| 5,642,563 A | * | 7/1997 | Bonnett | 296/203.03 |
| 5,655,811 A | * | 8/1997 | Sekine et al. | 296/203.03 |
| 5,788,532 A | * | 8/1998 | Takiguchi et al. | 439/374 |
| 5,806,620 A | * | 9/1998 | DeRees et al. | 180/69.21 |
| 5,810,309 A | * | 9/1998 | Augustine et al. | 280/838 |
| 5,820,191 A | * | 10/1998 | Blakewood et al. | 296/146.7 |
| 5,845,387 A | * | 12/1998 | Bonnett et al. | 29/527.1 |
| 5,947,520 A | * | 9/1999 | McHorse | 296/190.01 |
| 6,015,182 A | * | 1/2000 | Weissert et al. | 296/146.6 |
| 6,257,656 B1 | * | 7/2001 | Cook et al. | 296/180.2 |
| 6,299,243 B1 | * | 10/2001 | Gerald, Sr. | 296/210 |
| 2004/0012230 A1 | * | 1/2004 | Burge | 296/209 |

* cited by examiner

Primary Examiner—Kiran Patel
(74) Attorney, Agent, or Firm—Sidley Austin Brown & Wood LLP

(57) ABSTRACT

A body panel mounting system for a vehicle has panel supports, a hinge bar, a latch bar, a support bracket, fastening collars, fastening brackets, and fasteners. The panel supports are coupled to the body panel and are adapted to receive the hinge bar and the latch bar. The support bracket is attached to the vehicle chassis and is adapted to removeably receive the hinge bar. The fastening collars slideably couple to the latch bar. The fastening brackets are coupled to the chassis of the vehicle and are adapted to receive the fasteners. The fastener couples the latch bar to the vehicle chassis via the fastening collars.

14 Claims, 9 Drawing Sheets

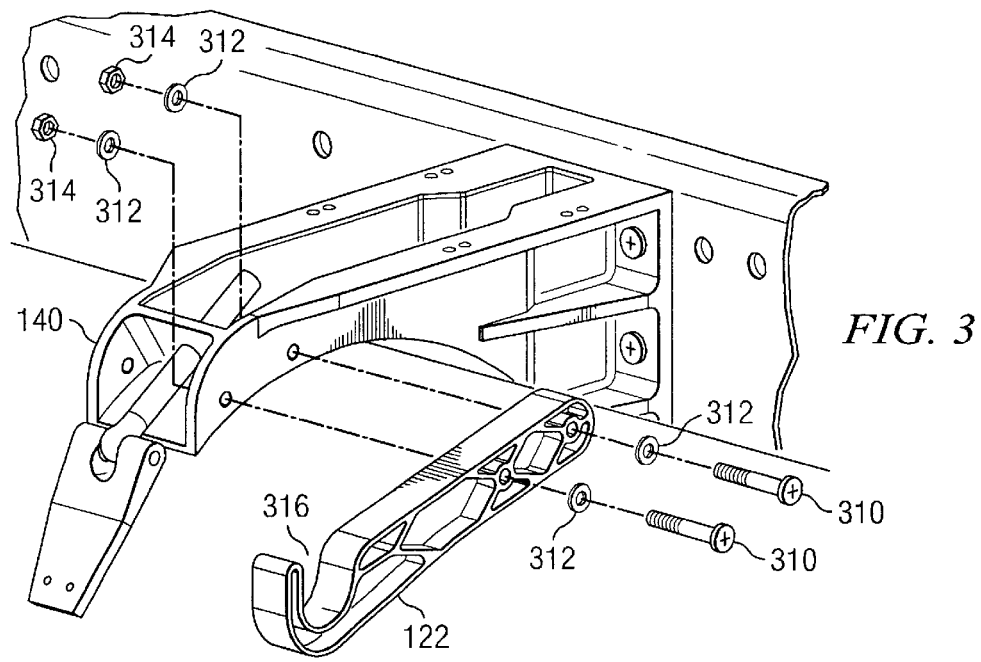
FIG. 3
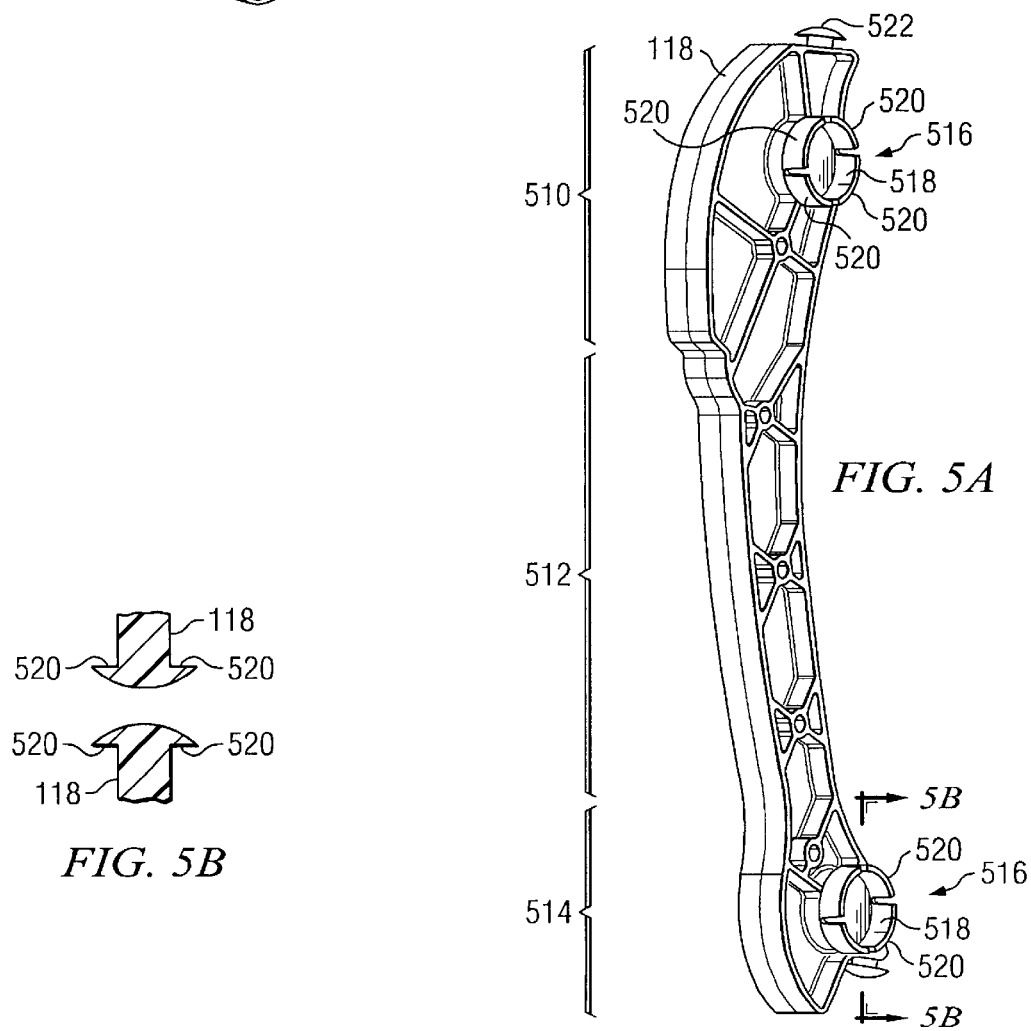
FIG. 5A
FIG. 5B

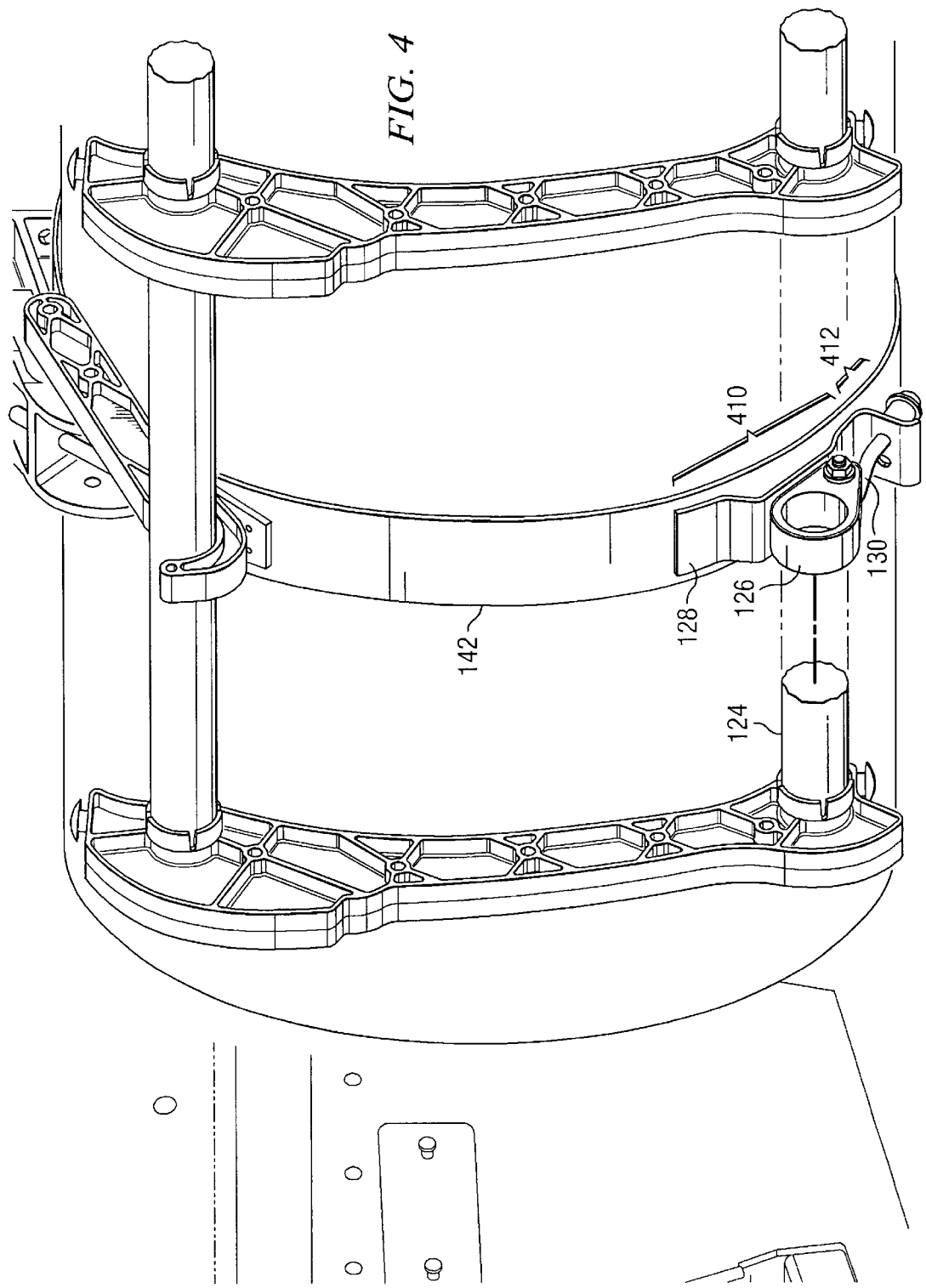

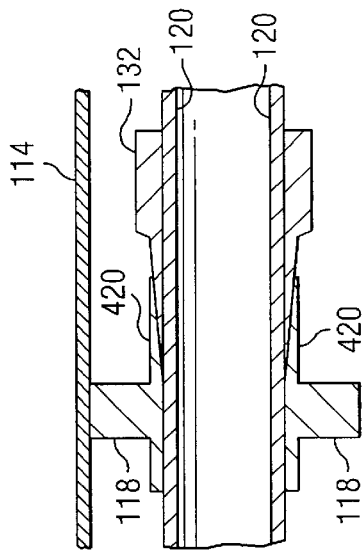
FIG. 8
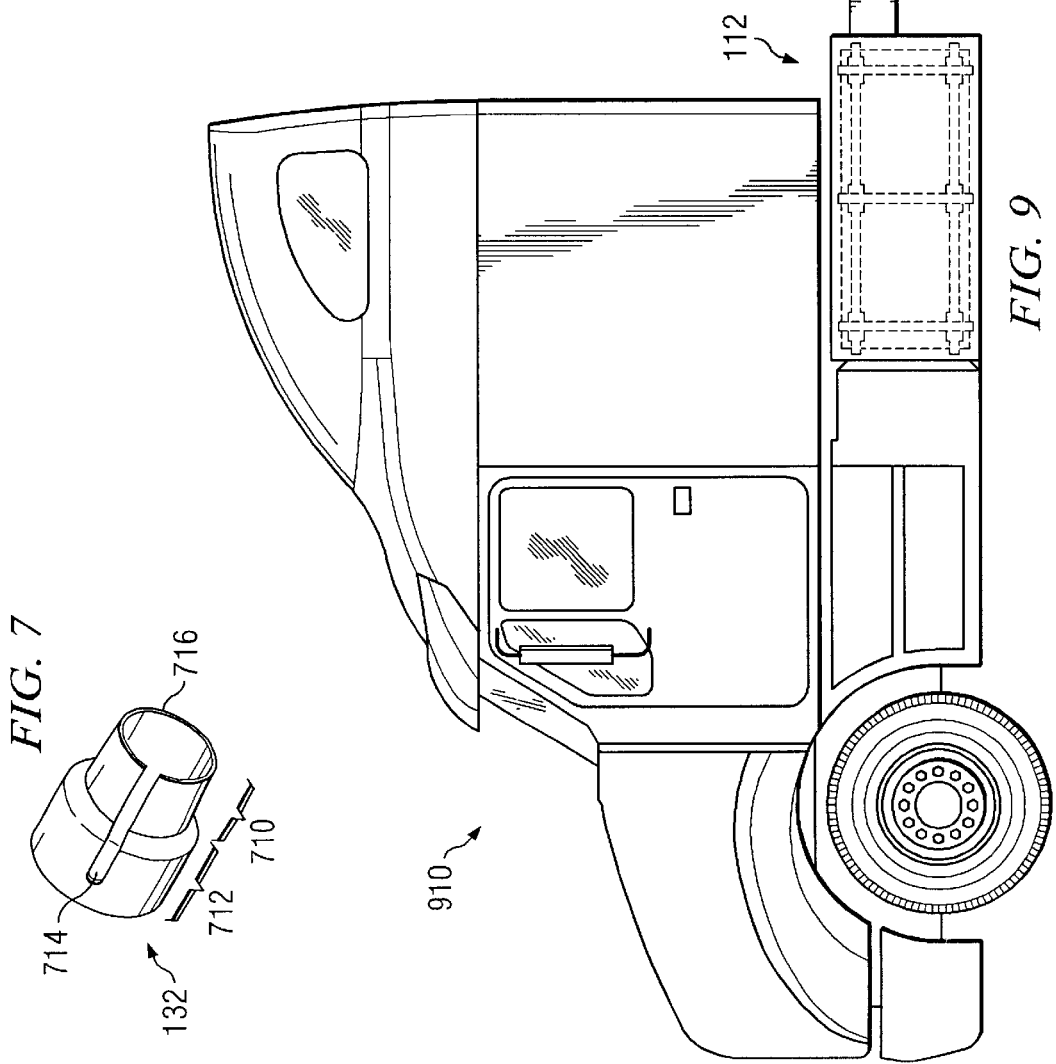
FIG. 7
FIG. 9

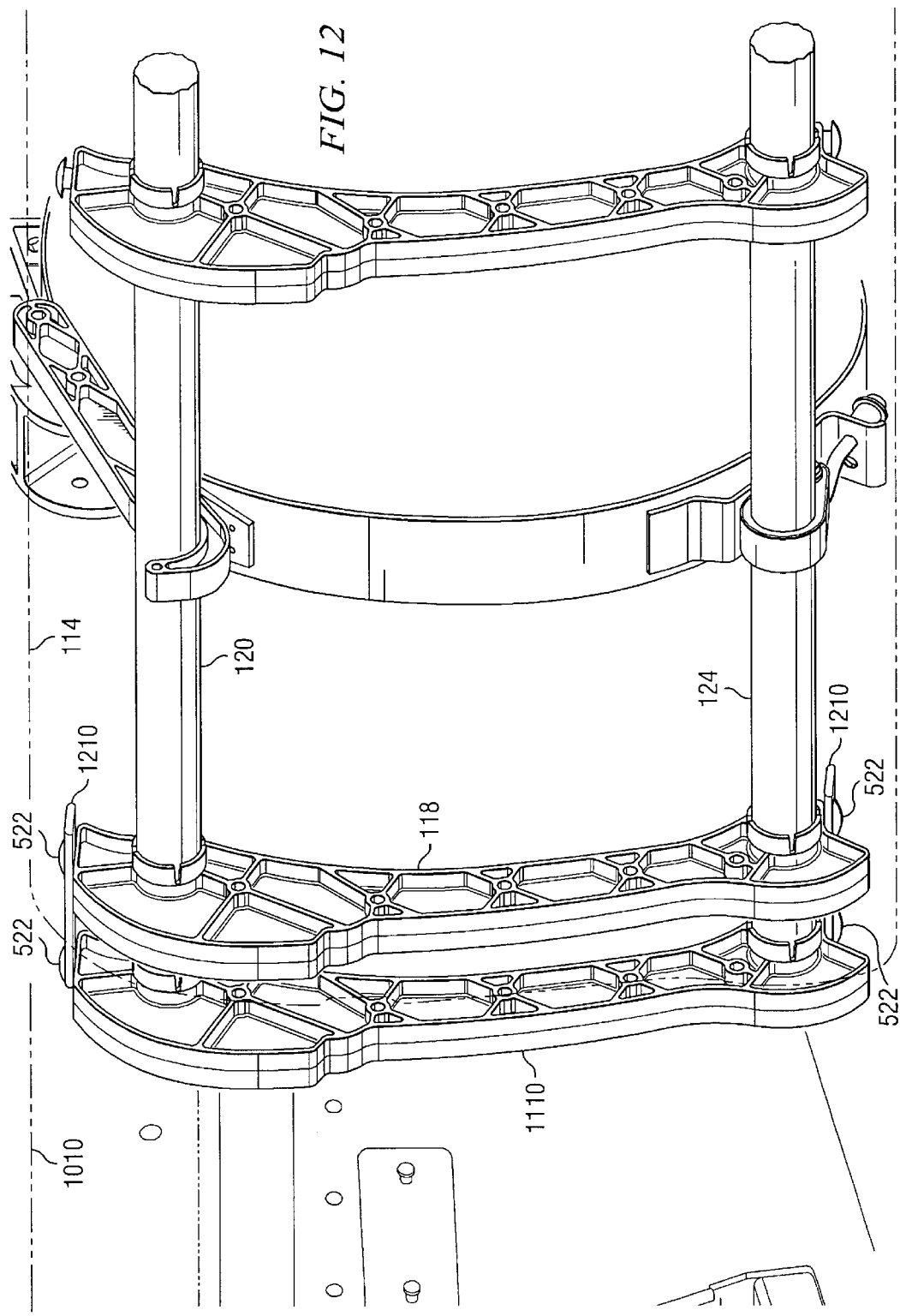

VEHICLE BODY PANEL MOUNTING SYSTEM

FIELD OF INVENTION

The present invention generally relates to a vehicle body panel mounting system, and in particular to a mounting system for attaching a vehicle body panel to improve the aerodynamics and appearance of the vehicle.

BACKGROUND OF INVENTION

Many vehicles, particularly commercial trucks, often have exposed fuel tanks, battery compartments, tool boxes, and the like. The exposed areas create considerable airflow disturbances, thereby reducing fuel economy. As a result, it is desirable to cover the exposed areas with a body panel that decreases the airflow disturbances and increases fuel economy.

There are commonly known systems that mount a body panel to a vehicle. Many of these systems, however, require a large number of attachment points using only bolts or screws. This makes the removal/installation of the body panel a time consuming and labor intensive process. Furthermore, while it is often desirable to have easy access to components located behind the body panel, these systems do not make it practical to frequently open or remove the body panel to access components located behind the body panel.

Other systems of mounting a body panel to a vehicle do not have a modular design that can be adapted to many different vehicles. For example, some mounting systems are only designed for a left-side body panel. Hence, such mounting systems can not be used to mount a right-side body panel and different parts would need to be designed and manufactured to mount a right-side body panel. Furthermore, some mounting systems are only designed for one particular size of body panel. Thus, there is a need for a body panel mounting system that can accommodate a variety of body panel shapes and sizes.

Furthermore, many of the body panel mounting systems restrain the thermal expansion of the body panel and the ability of the body panel to rack and slip, which can induce stress on the body panel. A vehicle often experiences a large range of temperatures throughout its life, e.g., different seasons, different geographical regions, causing the body panel to expand or contract accordingly. Additionally, road conditions and the flexing of the vehicle chassis cause the body panel to rack and slip relative to the vehicle chassis. Accordingly, the body panel mounting systems that prevent or restrain the thermal expansion of the body panel and the ability of the body panel to rack and slip induce stress on the body panel and can reduce the expected lifetime of the body panel.

Therefore, there is a need for a body panel mounting system that decreases airflow disturbances, eases removal/installation, provides adaptability for different vehicles, and allows for thermal expansion.

SUMMARY OF INVENTION

Many of the needs outlined above are addressed by the present invention. It is an object of the present invention to provide a body panel mounting system that has a minimum number of attachment points that must be unfastened to remove or fastened to install a body panel on a vehicle, thereby decreasing the amount of time and labor required to remove/install the body panel.

It is another object of the present invention to provide a body panel mounting system that has a modular design such that the same part content can accommodate a variety of sizes and shapes of body panels, as well as left and right sides.

It is yet another object of the present invention to provide a body panel mounting system that will allow for dimension changes in a body panel due to thermal expansion caused by temperature variations.

In accordance with one aspect of the present invention, one or more panel supports are coupled to a vehicle body panel. A hinge bar and a latch bar are coupled to the one or more panel supports. One or more support brackets are coupled to the vehicle chassis and provide a support structure for the hinge bar. The latch bar is coupled to the chassis.

In yet another embodiment of the present invention, one or more fastening collars are slideably coupled to the latch bar. The latch bar is coupled to the chassis via one or more fastening collars.

In yet another embodiment of the present invention, one or more fastening brackets are coupled to the chassis. Fasteners are utilized to couple the fastening collars to the chassis.

In yet another embodiment of the present invention, a second body panel is mounted adjacent to the vehicle body panel. One or more panel supports are coupled to the second body panel. The hinge bar and the latch bar protrude through the panel supports coupled to the vehicle body panel and through at least one of the panel supports coupled to the second body panel.

In yet another embodiment of the present invention, one or more elastic straps couple at least one panel support coupled to the vehicle body panel to at least one panel support coupled to the second body panel.

BRIEF DESCRIPTION OF DRAWINGS

Other objects and advantages of the invention will become apparent upon reading the following detailed description and upon reference to the accompanying drawings in which:

FIG. 3 is an exploded view of a support bracket mounted to a fuel tank support in accordance with an embodiment of the present invention;

FIG. 4 illustrates in greater detail a fastening bracket and lower connection in accordance with the embodiment shown in FIG. 1A;

FIG. 5A illustrates in greater detail a panel support in accordance with the embodiment shown in FIG. 1A;

FIG. 5B illustrates a cross-sectional view of a hatch-bar opening or a latch-bar opening of a panel support in accordance with an embodiment of the present invention;

FIG. 7 illustrates in greater detail a spacer in accordance with the embodiment shown in FIG. 1A;

FIG. 8 illustrates a cross-sectional view of a panel support and spacer coupled to a hinge bar or a latch bar in accordance with an embodiment of the present invention;

FIG. 9 illustrates a side view of a truck incorporating a vehicle body panel mounting system in accordance with an embodiment of the present invention;

FIG. 12 illustrates the vehicle body panel mounting system of the embodiment shown in FIG. 10, wherein the second body panel and the vehicle body panel are transparent to better illustrate the support structure.

DETAILED DESCRIPTION OF INVENTION

Figure 1A:
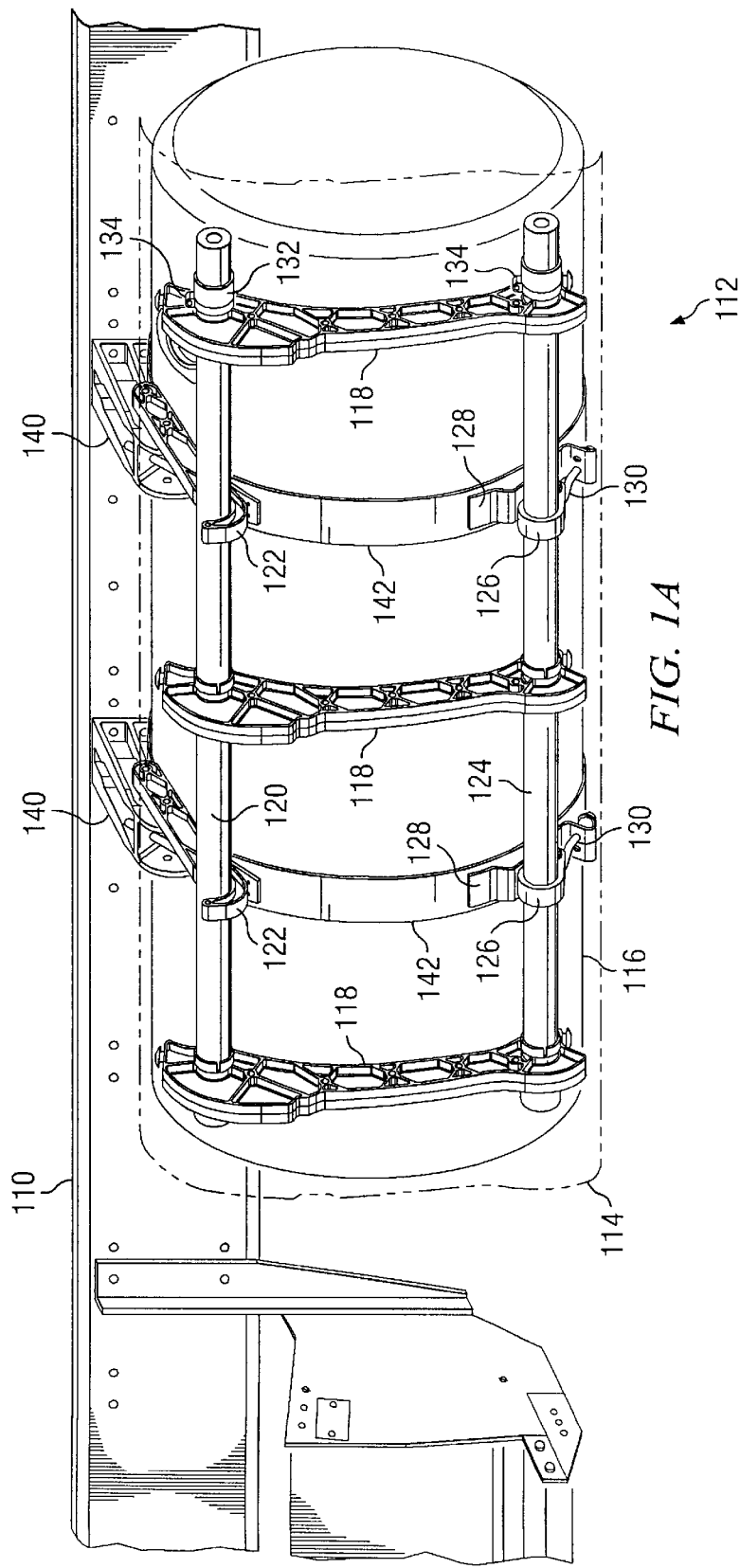
FIG. 1A illustrates a portion of a vehicle chassis incorporating a body panel mounting system, including a vehicle body panel, in accordance with an embodiment of the present invention.

Referring now to the drawings, wherein like reference numbers are used to designate like elements throughout the various views, a first embodiment as well as other possible embodiments and modifications are further described.

For illustrative purposes only, the following discussion illustrates and discusses the present invention in reference to an embodiment in which the present invention is utilized to mount a body panel to a portion of a truck. One of ordinary skill in the art, however, will appreciate that the present invention may be utilized to mount many objects in many different environments. For example, an embodiment of the present invention may be utilized to mount wall sections, art, decorative objects, cabinets, shelves, boards, and the like. Furthermore, the items mounted may be mounted to walls, frames, cars, campers, houses, sheds, and the like.

Figure 1B:
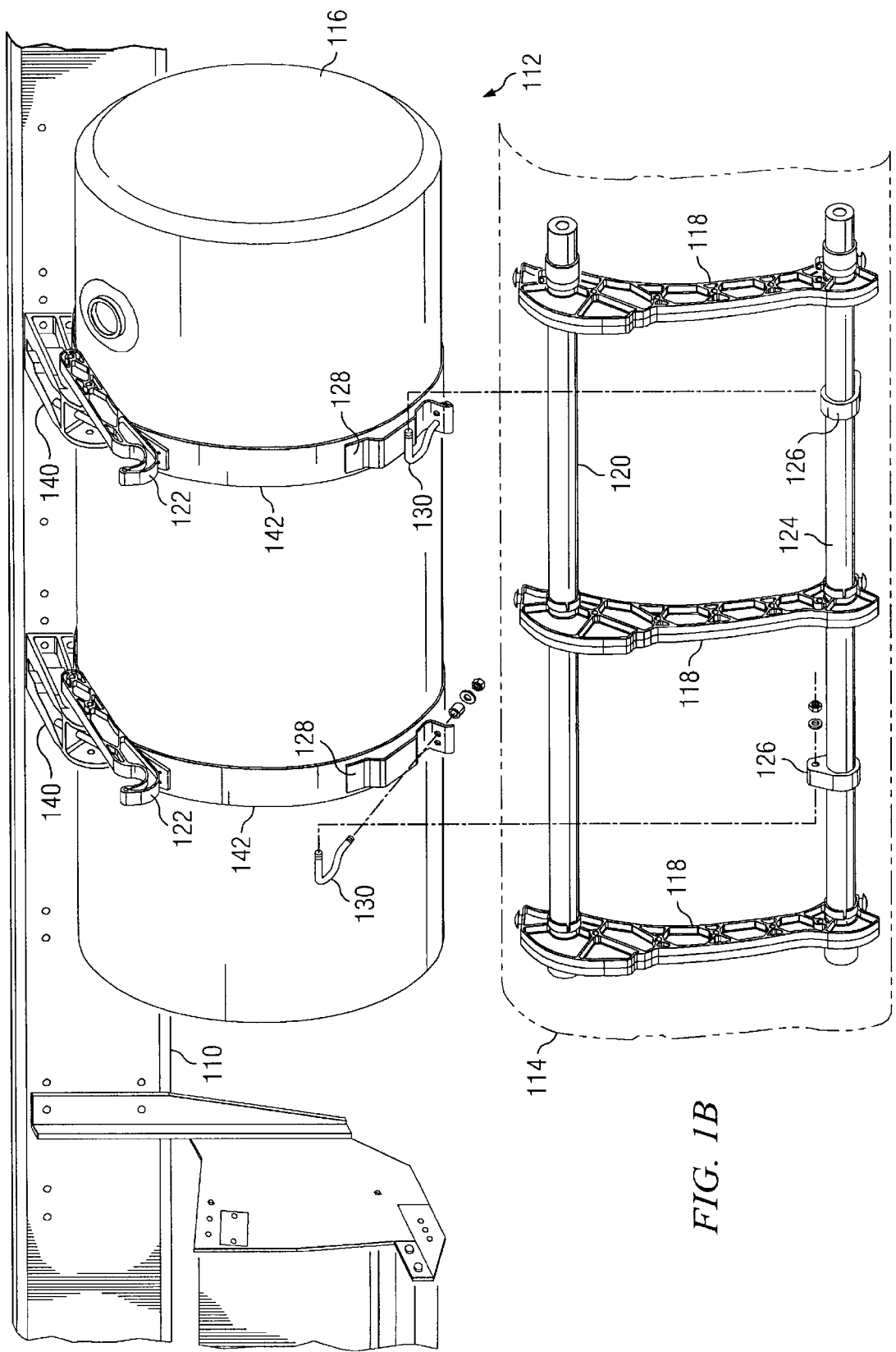
FIG. 1B illustrates a body panel mounting system in accordance with the embodiment illustrated in FIG. 1A, wherein the vehicle body panel is removed.

FIGS. 1A and 1B illustrate a vehicle chassis 110 incorporating a body panel mounting system 112 according to an embodiment of the present invention, wherein FIG. 1A illustrates the vehicle body panel 114 (transparent for ease of viewing structure of mounting system) installed and FIG. 1B illustrates the vehicle body panel 114 removed. For illustrative purposes only, FIGS. 1A and 1B illustrate an embodiment of the present invention wherein the vehicle body panel 114 is removably fastened to a fuel tank 116. One of ordinary skill in the art, however, will appreciate that the present invention may be utilized to mount a vehicle body panel to other objects in a variety of configurations, such as a tool box, a storage box, a truck chassis, and the like. Accordingly, the body panel mounting system 112 illustrated in FIGS. 1A and 1B comprises three panel supports 118, a hinge bar 120, two support brackets 122, a latch bar 124, two fastening collars 126, two fastening brackets 128, two j-hook bolts 130, two spacers 132, and two clamps 134.

Figure 2:
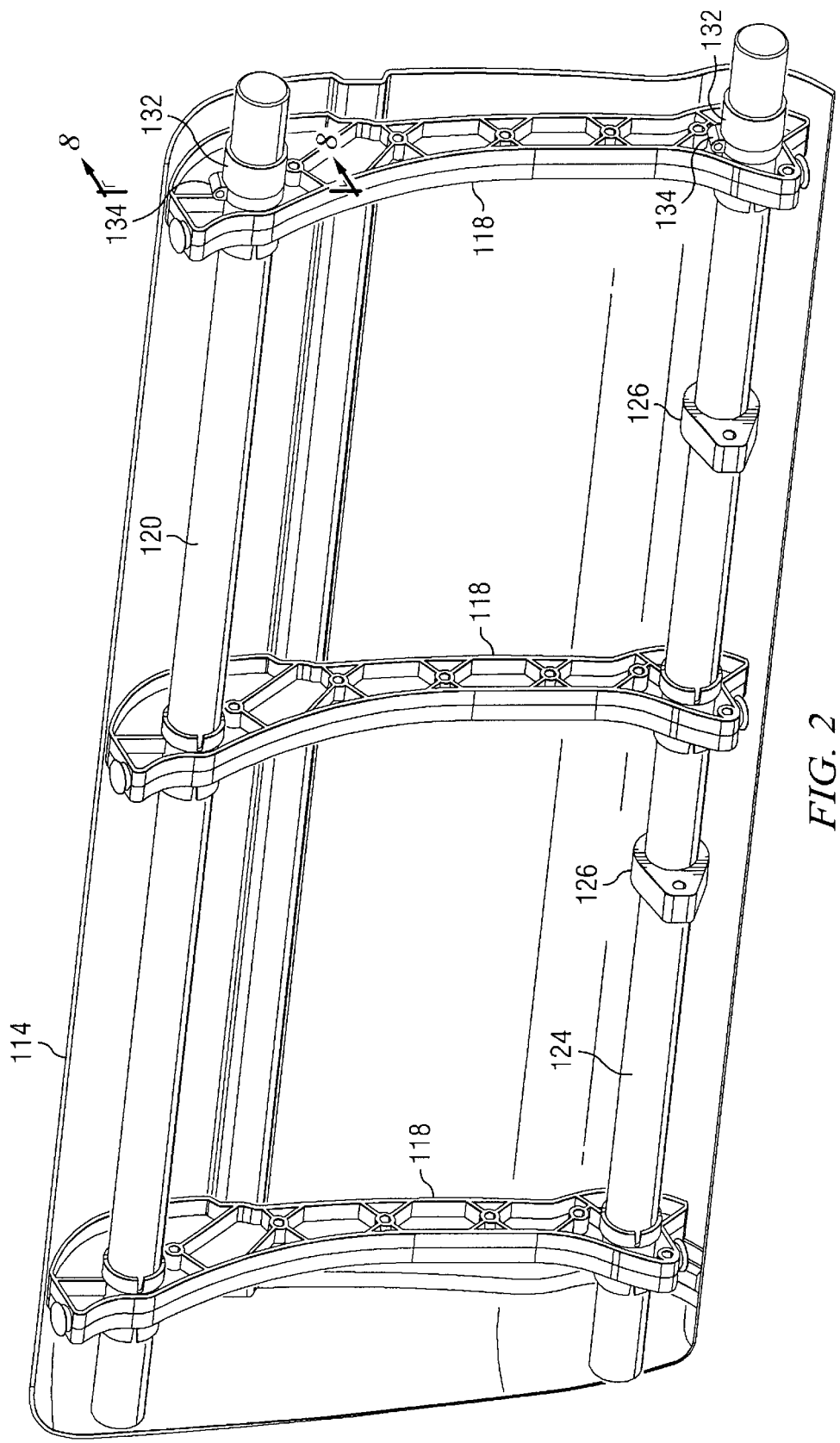
FIG. 2 is an interior view of the vehicle body panel of FIG. 1A.

FIG. 2 illustrates an interior view of the vehicle body panel 114 of FIGS. 1A and 1B to better illustrate portions of the body panel mounting system 112 in accordance with an embodiment of the present invention.

Referring to FIGS. 1A, 1B, and 2, as will be described in greater detail below, the body panel mounting system 112 generally uses a hinge and latch combination to removably fasten a vehicle body panel 114 to the vehicle chassis 110. One or more panel supports 118 are coupled to the vehicle body panel 114, and the hinge bar 120 is coupled to the panel supports 118. Additionally, one or more support brackets 122 are coupled to a section of the vehicle chassis 110, such as the fuel tank support bracket 140 as illustrated in FIGS. 1A and 1B. Thus, the hinge bar 120 may be set upon the support brackets 122, providing a structure by which the vehicle body panel 114 may be supported while being positioned and secured.

Furthermore, the latch bar 124 is coupled to the panel supports 118, and one or more fastening collars 126 are slideably coupled to the latch bar 124. One or more fastening brackets 128 are coupled to a portion of the chassis 110, such as the fuel tank support bracket 140 via a fastening bracket 142 as illustrated in FIGS. 1A and 1B. The latch bar 124 is removably fastened to the fastening brackets 128 via the j-hook bolts 130 and one or more fastening collars 126. Accordingly, the vehicle body panel 114 may be easily positioned, secured, and removed to allow access to components located behind the vehicle body panel, such as a battery, a fuel tank, a storage compartment, or the like. Furthermore, a truck manufacturer often varies the components contained behind the vehicle body panel, depending on the intended function of the vehicle. With the flexibility of attachment locations for the hinge bar 120 and the fastening collars 126, the present invention adapts to varying locations for the support brackets 122 and the fastening brackets 128. Thus, the manufacturer can easily vary the bracket locations to accommodate different component combinations and configurations behind the vehicle body panel 114 without changing the part content of the body panel mounting system 112 that retains the vehicle body panel 114. Additionally, truck manufacturers often produce a variety of truck configurations having different sleeper cab sizes (i.e., different lengths and heights), which require various vehicle body panel lengths to match. Because the vehicle body panel mounting system 112 is modular, the present invention can accommodate sleeper cab length variations using the same part content.

Referring to the hinge bar 120 and the latch bar 124 of FIGS. 1A, 1B, and 2, the hinge bar and the latch bar are preferably hollow metal bars formed by extrusion, having a uniform, circular cross-section along their longitudinal extent. Preferably, the hinge bar 120 and the latch bar 124 are identical to reduce manufacturing costs and ease installation. Furthermore, by having a uniform cross-section, each bar may be cut to the desired length to accommodate a variety of body panel lengths. One of ordinary skill in the art will appreciate that the hinge bar 120 and the latch bar 124 may be manufactured from various materials, such as aluminum alloys, steel, titanium alloys, thermal plastics, polymers, composites, and the like, and by various methods, such as machining, molding, forging, and the like.

FIG. 3 illustrates in greater detail an exploded view of the support bracket 122 of FIGS. 1A and 1B in accordance with an embodiment of the present invention. Preferably, each support bracket 122 has a generally U-shaped portion and is mounted such that the U-shaped portion opens upward. Furthermore, the support bracket 122 preferably has a portion for securing the support bracket 122 to the vehicle chassis 110. In the embodiment illustrated in FIGS. 1A, 1B, and 3, the support bracket 122 is adapted for mounting to a fuel tank support bracket 140 via bolts 310, washers 312, and nuts 314, wherein the fuel tank support bracket 140 is coupled to the chassis 110. Alternatively, the support brackets 122 may be coupled to other structures, such as the vehicle frame itself, a tool box, a battery compartment, a storage box, or the like. Similarly, the support brackets 122 may be coupled via other means, such as epoxy, welding, screws, rivets, and the like.

Each support bracket 122 is preferably manufactured of aluminum via standard die-cast methods. The support brackets 122, however, may be manufactured of other materials, such as aluminum alloys, steel, titanium alloys, thermal plastics, polymers, composites, and the like, and by other manufacturing techniques, such as machining, extrusion, welding, forging, and the like.

Furthermore, a wear pad 312 is preferably coupled to each support bracket 122 at the location that the hinge bar 120 rests upon the support bracket 122, i.e., the U-shaped portion. The wear pad 312 provides a surface upon which the hinge bar 120 can rest, reducing the vibration between the hinge bar 120 and the support brackets 122. Preferably, the wear pads 312 are affixed to the support brackets 122 via a self-restraining mechanism due to the unique shape of the wear pad. Alternatively, the wear pads 312 may be affixed to the support brackets 122 via an adhesive, screws, rivets, bolts, or the like. The wear pads 312 are preferably manufactured of polymeric material via injection molding. Preferably, the manner in which the wear pad 312 is affixed to the support bracket 122 accommodates replacement of the wear pad 312 due to normal wear and tear.

FIG. 4 illustrates in greater detail the fastening brackets 128 of FIGS. 1A and 1B in accordance with an embodiment of the present invention. Generally, the fastening brackets provide a wear plate and bracket mechanism for providing a wear plate interface between the fastening collar 126 and the chassis and for removeably coupling the latch bar 124 to the chassis. Accordingly, as shown in the embodiment illustrated in FIG. 4, the fastening brackets 128 preferably comprise a contoured portion 410 and a raised portion 412. The contoured portion 410 is shaped such that it provides a support area in which the fastening bracket 128 may be coupled to the chassis and provides a wear plate interface upon which the fastening collar 126 may contact the fastening bracket 128. Accordingly, the contoured portion 410 of the fastening bracket 128 is shaped to fit the contours of the fuel tank strap 142, wherein the fuel tank strap 142, in turn, is secured to the chassis. Preferably, the fastening brackets 128 are coupled to the vehicle chassis 110, e.g., the fuel tank support strap 142, via welds, epoxy, bolts, screws, or the like.

The raised portion 412 of the fastening bracket 128 preferably comprises one or more attachment points, such as holes, slots, or the like, through which a fastener may be removeably secured. In the embodiment illustrated in FIG. 4, the raised portion 412 includes a hole through which the j-hook bolts 130 may be removeably secured. Accordingly, as illustrated in greater detail below in FIGS. 6A–6C, the j-hook bolts 130 couple the latch bar 124 to the vehicle chassis 110 via the fastening brackets 128 and fastening collars 126.

FIGS. 5A and 5B illustrate in greater detail the panel support 118 of FIGS. 1A, 1B, and 2 in accordance with an embodiment of the present invention. In particular, FIG. 5A illustrates the panel support 118 and FIG. 5B illustrates a preferred cross-sectional view of a support hole. Preferably, all of the panel supports 118 are identical to reduce manufacturing costs and to increase the flexibility in positioning. Each panel support 118 generally has a contoured upper portion 510, a middle portion 512, and a contoured lower portion 514. The vehicle body panel 114 rests against the contoured upper portion 510 and the contoured lower portion 514, both of which are shaped to approximate the contour of the vehicle body panel 114. Preferably, the contoured upper portion 510 and the contoured lower portion 514 of each panel support 118 is adhesively bonded to the vehicle body panel 114 via mechanical or solvent bonding techniques. Alternatively, the size of the contoured portions of the panel support 118 may be greater or lesser, depending on the size of the vehicle body panel 110 and the intended application. For example, some situations may require that the adhesive be applied to the entire length of the panel support 118, requiring the entire length of the panel support to roughly conform to the shape of the vehicle body panel. Other configurations, however, may use smaller and/or lighter components, requiring a relatively smaller area to which an adhesive must be applied.

Furthermore, each panel support 118 includes a hinge-bar support hole 516 and a latch-bar support hole 518 at approximately longitudinally opposing ends of the panel support 118. Preferably, each of the hinge-bar support hole 516 and the latch-bar support hole 518 generally conforms in shape to the cross-section of the hinge bar 120 and the latch bar 124, respectively. Furthermore, the size of the hinge-bar support hole 516 and the latch-bar support hole 518 are of a size sufficient to allow the hinge bar 120 and the latch bar 124 to pass therethrough, respectively. Preferably, as illustrated in FIG. 5B, the interior surface of the hinge-bar support hole 516 and the latch-bar support hole 518 are convex shaped. The convex shape of the hinge-bar support hole 516 and the latch-bar support hole 518 allow the hinge bar 120 and the latch bar 122, respectively, to slip and twist in the respective holes as the vehicle body panel expands, contracts, racks, and flexes.

Preferably, one or more finger sections 520 protrude outward from the body of the panel support 118 and axially to the hinge-bar support hole 516 and the latch-bar support hole 518. The finger sections 520 preferably flare outward slightly from the opening of the hinge-bar support hole 516 and the latch-bar support hole 516, such that the diameter of the opening created by opposing finger sections 520 is slightly larger than the respective opening of the hinge-bar support hole 516 and the latch-bar support hole 518. As will be discussed in greater detail below with reference to FIG. 8, the increased diameter of the hole formed by the finger sections 520 accommodates a spacer (not shown in FIG. 5, reference numeral 132 in FIG. 8) for longitudinally securing the hinge bar 120 and the latch bar 124 to the panel supports 118.

Preferably, each panel support 118 comprises a fastening knob 522 on longitudinally opposing ends (only one fastening knob 522 is shown in FIG. 5). Each of the fastening knobs 522 is preferably a raised, elongated knob that is extended from the main body of the panel support 118 by a short, narrow supporting stub. The fastening knob 522 is generally larger than the supporting stub, such that a loop placed over the fastening knob will be prevented from becoming dislodged by the enlarged size of the fastening knob as compared to the supporting stub. The fastening knob is discussed in greater detail below in reference to FIG. 12.

Figure 6A:
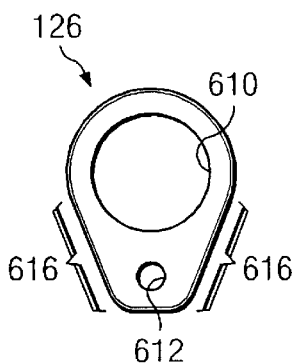
FIGS. 6A–6C illustrate in greater detail a fastening collar in accordance with the embodiment shown in FIG. 1A.
Figure 6B:
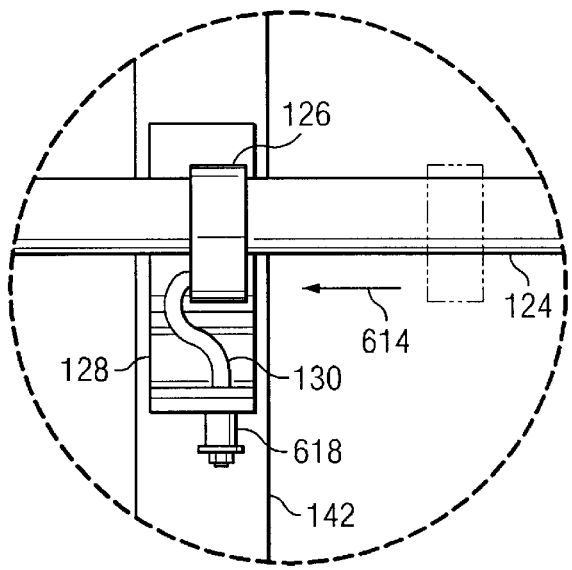
Figure 6C:
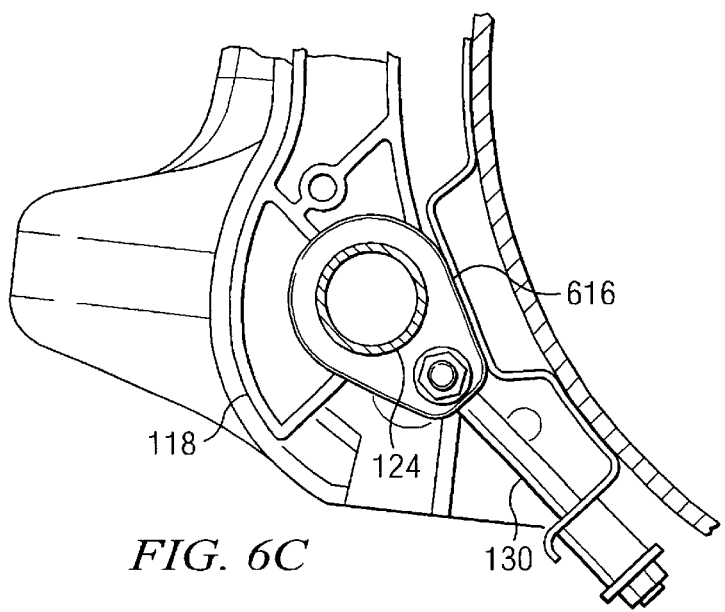

FIGS. 6A–6C illustrate in greater detail the fastening collars 126 of FIG. 1A in accordance with an embodiment of the present invention. The fastening collars 126 have a generally triangular cross-section with rounded corners and contain a bar hole 610 and a fastening hole 612. Preferably, the bar hole 610 generally conforms in shape to the cross-section of the latch bar 124, and the size of the bar hole 610 is sufficient to allow the latch bar 124 to pass therethrough, preferably with a minimum amount of movement or play within the bar hole 610. The fastening hole 612 generally conforms in shape to the cross-section of the j-hook bolt 130, and the size of the fastening hole 612 is sufficient to allow the j-hook bolt 130 to pass therethrough, preferably with a minimum amount of movement or play within the fastening hole 612.

Thus, the latch bar 124 is placed through the bar hole 610 of the fastening collar 126, thus slideably coupling the latch bar 124 to the fastening collar 126. After the vehicle body panel is positioned, the fastening collars 126 are positioned to align with the fastening brackets 128, as indicated by the arrow 614 of FIG. 6B. The j-hook bolts 130 can then be passed through the corresponding fastening holes 612 to couple the fastening collars 126 to the fastening brackets 128, thereby securing the vehicle body panel as illustrated in FIGS. 6B and 6C. Preferably, a spring 618 is utilized to reduce the tension on the vehicle body panel 114 and to allow for movement due to vibrations, temperature changes, and the like. The spring 618 maintains a relatively constant pressure against the hinge bar 120 to maintain the hinge bar 120 in contact with the support bracket 122, reducing the vibration between the hinge bar 120 and the support bracket 122. Preferably, the spring 618 is an elongated rubber washer manufactured of polymeric material, preferably EPDM rubber, via an injection molding or extrusion process. Alternatively, other types of springs, such as a metal spring and the like, may be used.

Furthermore, as illustrated in FIGS. 6A and 6C, the fastening collars 126 preferably contain a wear surface 616 on opposing faces of the fastening collars 126. The wear surface 616 provides a wear pad interface, i.e., a point of contact, wherein the vehicle body panel and the support structure is provided a secure positional support.

FIG. 7 illustrates in greater detail the spacer 132 of FIG. 1A in accordance with an embodiment of the present invention. Preferably, the spacer 132 has a generally ring-shaped cross-section with a wedge portion 710 and an outer portion 712. The shape of the ring-shaped cross-section of the spacer 132 generally conforms to the cross-section of the hinge bar 120 and the latch bar 124. The inner dimensions of the ring-shaped cross-section of the spacer 132 are sufficient to allow the hinge bar 120 and the latch bar 124 to pass therethrough, preferably with a minimum amount of movement or play within the spacer 132. The outer dimension of the wedge portion 710 increases steadily from the edge 716 to the transition from wedge portion 710 to outer portion 712. The outer diameter of the outer portion 712 is generally constant and of a diameter greater than the greatest diameter of the wedge portion 710.

Furthermore, the spacer 132 has a compression slot 714. The compression slot 714 allows for a compression fitting to be made between the panel support 118, the spacer 132, and the hinge bar 120 and/or the latch bar 124 by clamping or otherwise reducing the inner dimension of the spacer 132. Additionally, the compression slot 714 allows the spacer to conform to variations in the sizes and shapes of the hinge bar 120, the latch bar 124, and the spacer 132 due to manufacturing tolerances and expansion and/or contraction due to temperature variations.

FIG. 8 further illustrates the compression fitting formed between the panel support 118, the spacer 132, and the hinge bar 120. Preferably, a similar compression fitting is formed with the panel support 118, the spacer 132, and the latch bar 124. In the preferred embodiment, the hinge bar 120 and the latch bar 124 are positioned through the hinge bar support hole 516 and the latch bar support hole 518, respectively, of the panel support 118. The spacers 132 are slid around the hinge bar 120 and the latch bar 124 such that the wedge portion 710 of the spacer 132 is on a proximate side of the panel support 118. The wedge portion 710 wedges between the finger sections 520 (FIG. 5) of the panel support 118 and the hinge bar 120 and/or the latch bar 124. Preferably, a clamp (not shown) is utilized to form a compression fitting between the panel support 118 and the hinge bar 120 and/or the latch bar 124, longitudinally securing the hinge bar 120 and/or the latch bar 124 relative to the panel support 118 and the vehicle body panel 114. Alternatively, a set screw, a clip, a latching mechanism, adhesive, or the like may be used to longitudinally secure the hinge bar 120 and the latch bar 124 to the panel support 118.

Preferably, the hinge bar 120 and the latch bar 124 are coupled to only one panel support 118 to maximize the amount of rack and slip the vehicle body panel 114 has with respect to the vehicle chassis. In particular, by coupling the hinge bar 120 to only one panel support 118, the hinge bar 120 is allowed to slip and twist relative to the other panel supports 118, thereby allowing the vehicle body panel to expand, contract, rack, and flex with a minimal amount of stress on the vehicle body panel. Similarly, it is preferred that the latch bar 124 is coupled to only one panel support 118, as well.

As one of ordinary skill in the art will appreciate, the preferred embodiment described above utilizes soft connections. Soft connections are connections that do not utilize metal-on-metal contact points to reduce the vibration noise between components. Rather, contact points are preferably non-metallic material-on-metal. For example, the contact point between the hinge bar 120, which is preferably aluminum, and the support bracket 122, which is also preferably aluminum, is separated by the wear pad 312, which is preferably of a polymeric material. Additionally, the contact points between the hinge bar 120, which is preferably aluminum, and the panel support 118, which is preferably a non-metallic material, and between the latch bar 124, which is preferably aluminum, and the panel support 118 are soft connections. The contact points between the latch bar 124 and the fastening collars 126 and between the fastening collars 126 and the fastening brackets 128 are also preferably soft connections.

FIG. 9 illustrates a truck 910 incorporating the vehicle body panel mounting system. 112 according to an embodiment of the present invention. The hinge bar 120 and support brackets 122 are along the top of the vehicle body panel 114. The latch bar 124, fastening collars 126, the fastening brackets 128, and j-hook bolts 130 are along the bottom of the vehicle body panel. Hence, when the j-hook bolts 130 are detached, the vehicle body panel 114 can be tilted open about the hinge bar 120 (or it can be removed) to access components located behind the vehicle body panel (e.g., battery, fuel tank, storage compartment). The present invention thus allows the components located behind the vehicle body panel 114 to be more accessible and it makes serviceability of the components behind the vehicle body panel 114 easier. As one of ordinary skill in the art will appreciate, the preferred embodiment described above contains no metal-on-metal contact areas. For example, the hinge bar 120, which is preferably metal, is in contact with the support bracket and wear pad, which are aluminum and polymeric, respectively. Additionally, the fastening collar, which is preferably polyurethane, is in contact with the fastening bracket, which is preferably metal. Thus, vibration noise is reduced.

Figure 10:
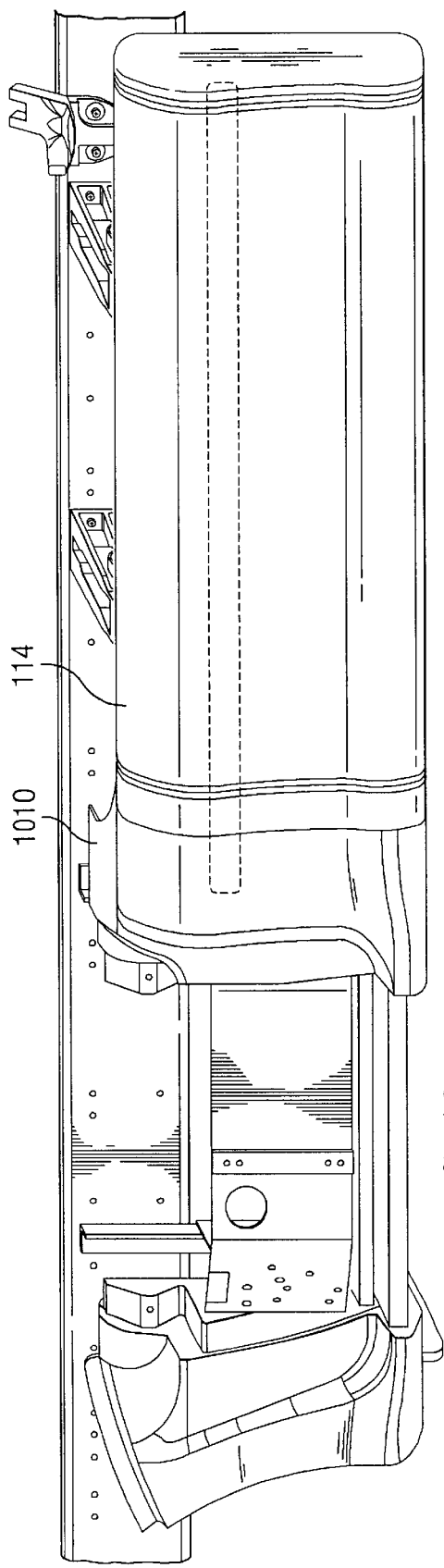
FIG. 10 illustrates a partial side view of a truck incorporating a vehicle body panel mounting system to mount a vehicle body panel adjacent to a second body panel in accordance with an embodiment of the present invention.

FIG. 10 illustrates a vehicle body panel 114 mounted adjacent to a second body panel 1010 in accordance with an embodiment of the present invention. Specifically, the vehicle body panel 114 (configured and mounted as described above with reference to FIGS. 1–9) is mounted such that it is desired to adjacently mount a second body panel 1010, mounted in accordance with an embodiment of the present invention or otherwise. Frequently, the second body panel 1010 and the vehicle body panel 114 contain surface markings or other variations, such as indentations, striping, and the like, that make it desirable to accurately mount and align the adjacent body panel 1010 with the vehicle body panel 114 such that the surface markings or other variations are properly aligned. Thus, in accordance with an embodiment of the present invention, the second body panel 1010 and the vehicle body panel 114 are mounted to the vehicle chassis as described below with reference to FIGS. 11–12.

Figure 11:
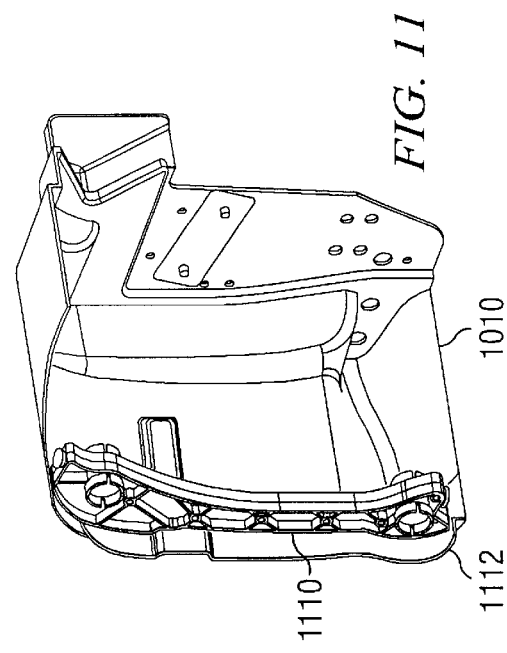
FIG. 11 illustrates an interior view of the second body panel of the embodiment shown in FIG. 10.

FIG. 11 illustrates the interior support structure of the second body panel 1010 in accordance with an embodiment of the present invention. The second body panel 1010 is preferably configured with an adjacent panel support 1110 coupled to the interior portion of the second body panel 1010 in a position corresponding to the relative position of the panel supports 118 coupled to the vehicle body panel 114. Preferably, the adjacent panel support 1110 is identical to the panel supports 118 described above with reference to FIGS. 1–9, reducing the manufacturing costs and easing installation. Furthermore, the adjacent panel support 1110 is preferably coupled to the interior portion of the second body panel 1010 in a manner similar to the manner the panel supports 118 are coupled to the vehicle body panel 114.

Furthermore, the second body panel 1010 optionally comprises an overlapping portion 1112. The overlapping portion 1112 of the second body panel is a recessed portion (as viewed from the exterior side), allowing the vehicle body panel 114 to be positioned overlapping the second body panel 1010 on the overlapping section 1112. Preferably, however, the overlapping portion 1112 of the second body panel 1010 does not contact the vehicle body panel 114, thereby reducing the vibration noise between the second body panel 1010 and the vehicle body panel 114. Alternatively, the vehicle body panel 114 may have an overlapping section in which the second body panel overlaps, there may not be an overlapping section, or the like.

FIG. 12 illustrates the body panel mounting system 112 illustrated in FIG. 10, wherein the second body panel 1010 and the vehicle body panel 114 are transparent to better illustrate the support structure, in accordance with an embodiment of the present invention. Preferably, the hinge bar 120 is of a length such that, when properly positioned, the hinge bar 120 extends through the hinge bar hole 516 (FIG. 5) of the panel support 118 and the adjacent panel support 1110. Similarly, the latch bar 124 is of a length such that, when properly positioned, the latch bar 124 extends through the latch bar hole 518 (FIG. 5) of the panel support 118 and the adjacent panel support 1110. By thus positioning these components, the second body panel 1010 is aligned with the vehicle body panel 114, and the joint is flexible to account for thermal expansion and chassis racking or flexing.

Optionally, elastic straps 1210 are positioned over the fastening knob 522 of the adjacent panel support 1110 and the nearest panel support 118 to provide additional positional support. Preferably, the elastic straps 1210 are manufactured of polymeric material, preferably EPDM rubber via injection molding or cast manufacturing techniques.

The embodiments described above, as well as all other embodiments of the present invention, may have many variations. For example, each of the components of an embodiment may be made from various materials, including, but not limited to, aluminum alloys, steel, titanium alloys, thermal plastics, polymers, and composites. Also, the components may be made using various methods, including, but not limited to, extrusion, machining, welding, molding, and forging. The hinge bar 120 and the latch bar 124 may be any length for a given application. The number of attachment points for the hinge bar 120 and the latch bar 124 to the chassis 110 can vary. The hinge bar 120 and the latch bar 124 may be hollow or solid. The hinge bar 120 and the latch bar 124 may have a uniform cross-section along its entire longitudinal extent, or they may have only portions that are adapted to interlock with a support bracket 122 and/or a fastening collar 126, respectively. The hinge bar 120 and the latch bar 124 may be bent to follow the contour of a given vehicle body panel 114. Also, the number of support brackets 122 and fastening collars 126 may vary. For example, a longer body panel may need more support brackets 122 and fastening collars 126 than a shorter body panel to support the longer body panel. The length of each support bracket 122 may vary. Similarly, the number of fastening collars 126 may vary, and the length of each fastening collar 126 may vary. The panel supports 118 may or may not have the finger sections 520 (FIG. 5) for retaining the hinge bar 120 and the latch bar 124. Instead, other commonly known ways of fastening the hinge bar 120 and the latch bar 124 may be incorporated, including, but not limited to: rivets, bolts, bonding, adhesive, and welding. Furthermore, other commonly known ways of fastening a vehicle body panel 114 to the panel supports 118 may be incorporated, including, but not limited to: rivets, bolts, bonding, adhesive, and welding. Therefore, a body panel mounting system 112 according to the present invention can be adapted for a variety of body panel sizes and shapes. The orientation of a vehicle body panel 114 held by the body panel mounting system 112 in its mounted position may vary also (e.g., vertical, horizontal, slanted, upside down). The hinge bar 120 could be on top with the latch bar 124 on bottom or vice-versa, and the hinge bar 120 may be to the right of the latch bar 124 or vice-versa. Because body panel contours can vary, the contour of the panel supports 118 may vary accordingly.

It will be appreciated by those skilled in the art having the benefit of this disclosure that this invention provides a vehicle body panel mounting system using a hinge and latch combination to fasten a body panel to a vehicle chassis. It should be understood that the drawings and detailed description herein are to be regarded in an illustrative rather than a restrictive sense, and are not intended to limit the invention to the particular forms disclosed. On the contrary, the invention includes any further modifications, changes, rearrangements, substitutions, alternatives, design choices, and embodiments apparent to those of ordinary skill in the art without departing from the spirit and scope of this invention, as defined by the following claims. Thus, it is intended that the following claims be interpreted to embrace all such further modifications, changes, rearrangements, substitutions, alternatives, design choices, and embodiments.

The claimed invention is:

1. A body panel mounting system for mounting a body panel on a vehicle having a chassis, comprising:
    a hinge bar;
    a latch bar;
    at least one panel support having one or more contoured sections generally conforming to the body panel, a hinge bar opening being of a shape and size such that the hinge bar may slide into and out of the hinge bar opening, and a latch bar opening being of a shape and size such that the latch bar may slide into and out of the latch bar opening;
    at least one support bracket having a hook area adapted for receiving the hinge bar, each support bracket being adapted for attaching to the chassis;

at least one fastening collar having a first opening of a size and shape such that the latch bar may slide into and out of the first opening, each fastening collar being adapted for receiving a fastener; and the fastener adapted for coupling the fastening collars to the chassis.

2. The body panel mounting system of claim 1, further comprising:

at least one fastening bracket adapted for attaching to a fuel tank strap that is coupled to the chassis and adapted for receiving the fastener.

3. The body panel mounting system of claim 1, further comprising:

at least one fastening bracket adapted for attaching to the chassis and adapted for receiving the fastener, each fastening bracket having a wear pad interface portion adapted for providing a contact surface for the fastening collar.

4. The body panel mounting system of claim 1, wherein each panel support includes one or more first finger sections for being compressed about the hinge bar and includes one or more second finger sections for being compressed about the latch bar, the body panel mounting system further comprising:

at least one first spacer having a generally ring-shaped cross-section with a wedge portion and an outer portion, the wedge portion having an inner size and shape such that the hinge bar may slide into and out of the wedge portion, the wedge portion having a generally increasing outer diameter from an outside edge to a transition from the wedge portion to the outer portion of the first spacer, the outer portion having an inner size and shape such that the hinge bar may slide into and out of the ring-shaped outer portion, wherein the first spacer is adapted for placing the wedge portion between the first finger section of the panel support and the hinge bar; and at least one second spacer having a generally ring-shaped cross-section with a wedge portion and an outer portion, the wedge portion having an inner size and shape such that the latch bar may slide into and out of the wedge portion, the wedge portion having a generally increasing outer diameter from an outside edge to a transition from the wedge portion to the outer portion of the second spacer, the outer portion having an inner size and shape such that the latch bar may slide into and out of the ring-shaped outer portion, wherein the second spacer is adapted for placing the wedge portion between the second finger section of the panel support and the latch bar.

5. The body panel mounting system of claim 4, wherein the first spacer and the second spacer are substantially equivalent, and the hinge bar and the latch bar are substantially equivalent.

6. The body panel mounting system of claim 1, wherein each panel support includes one or more first finger sections for being compressed about the hinge bar and includes one or more second finger sections for being compressed about the latch bar, the body mounting system further comprising:

at least one first spacer adapted for wedging between the hinge bar and the first finger section;

at least one second spacer adapted for wedging between the latch bar and the second finger section;

at least one first clamp adapted for creating a compression fitting between the first finger section, the first spacer, and the hinge bar; and at least one second clamp adapted for creating a compression fitting between the second finger section, the second spacer, and the latch bar.

7. The body panel mounting system of claim 1, wherein each support bracket includes a wear pad for providing a contact area where the support bracket receives the hinge bar.

8. The body panel mounting system of claim 1, wherein each fastening collar is adapted for providing a wear pad interface between the latch bar and the chassis.

9. The body panel mounting system of claim 1, wherein each fastening collar has a second opening being of a size and shape such that a fastener may slide into and out of the second opening, the body panel mounting system further comprising:

at least one fastening bracket having a first section being adapted for attaching to the chassis and a second section adapted for receiving the fastener.

10. The body panel mounting system of claim 1, wherein the fastener is a j-hook bolt adapted for coupling the fastening collar to the chassis.

11. The body panel mounting system of claim 1, wherein the hinge bar opening and the latch bar opening have a generally convex-shaped cross section.

12. The body panel mounting system of claim 1, wherein the hinge bar is coupled to at most one panel support and the latch bar is coupled to at most one panel support.

13. A method of installing a body panel that is attached to a vehicle chassis by a body panel mounting system, said body panel mounting system including a hinge bar, a latch bar, at least one fastening collar, at least one support bracket, and at least one j-hook bolt, the method comprising the steps of:

lowering the body panel such that the hinge bar rests upon the support bracket, the hinge bar being attached to the body panel and the support bracket being coupled to the chassis; and fastening the j-hook bolt to the chassis, the j-hook bolt being coupled to the fastening collar, the fastening collar being coupled to the latch bar, and the latch bar being coupled to the body panel.

14. The method of claim 13, further comprising the step of installing a strap that couples a first panel support coupled to the body panel to a second panel support coupled to an adjacent body panel.

* * * * *